United States Patent [19]

Hanna

[11] Patent Number: 4,756,041
[45] Date of Patent: Jul. 12, 1988

[54] APPARATUS FOR WASHING THE UPRIGHT SURFACES OF VEHICLES

[76] Inventor: Daniel C. Hanna, 1133 SW. Rivington Dr., Portland, Oreg. 97201

[21] Appl. No.: 63,508

[22] Filed: Jun. 17, 1987

[51] Int. Cl.$^4$ .............................................. B60S 3/06
[52] U.S. Cl. .................................. 15/97 B; 15/53 AB; 15/DIG. 2
[58] Field of Search ............... 15/DIG. 2, 97 B, 53 R, 15/53 A, 53 AB

[56] References Cited

U.S. PATENT DOCUMENTS

| | | |
|---|---|---|
| 1,740,546 | 12/1929 | Leschke ............................ 15/53 AB |
| 2,242,692 | 5/1941 | Yingling ............................ 15/53 AB |
| 3,350,733 | 8/1966 | Hanna . |
| 3,517,405 | 6/1970 | Hanna . |
| 3,593,357 | 7/1971 | Oldham . |
| 3,694,844 | 10/1972 | Welter . |
| 3,704,476 | 12/1972 | Hanna . |
| 3,934,297 | 1/1976 | Hanna . |
| 3,939,521 | 2/1976 | Clark . |
| 3,943,590 | 3/1976 | Hanna . |
| 4,441,226 | 4/1984 | Hanna . |
| 4,608,726 | 9/1986 | Hanna . |
| 4,670,929 | 6/1987 | Hanna . |

FOREIGN PATENT DOCUMENTS

| | | |
|---|---|---|
| 497422 | 11/1953 | Canada . |
| 0012683 | 6/1980 | European Pat. Off. . |
| 0085938 | 8/1983 | European Pat. Off. . |
| 59-81241 | 7/1984 | Japan . |

Primary Examiner—Edward L. Roberts
Attorney, Agent, or Firm—Klarquist, Sparkman, Campbell, Leigh & Whinston

[57] ABSTRACT

A vehicle apparatus for washing upright surfaces of vehicles has an upper washer rotatable about a first upright axis and a lower washer rotatable about a second upright axis. The washers are loosely coupled together so as to permit lateral shifting of the two axes and washers relative to one another within limits.

13 Claims, 2 Drawing Sheets

APPARATUS FOR WASHING THE UPRIGHT SURFACES OF VEHICLES

The present invention relates to an apparatus for washing vehicles and more specifically to an apparatus for washing the upright surfaces of vehicles.

Heretofore, a number of prior art devices and brush constructions have been employed for cleaning side and other upright surfaces of vehicles. One such device comprises a "wraparound" brush and is disclosed in U.S. Pat. No. 3,350,773 of Hanna. In such a device, the brush is rotated about a vertical axis. As a vehicle is advanced through a vehicle wash, the brush travels from the front of the vehicle, along the side of the vehicle and along the rear of the vehicle. The brush includes bristles uniformly spaced about and mounted to a central small diameter core. These bristles extend outwardly and against the surfaces of the vehicle being cleaned.

Another vehicle washing apparatus and brush construction is disclosed in U.S. Pat. No. 4,441,226 of Hanna. This device has an upper cylindrical rotary brush of a first uniform diameter and a lower cylindrical rotary brush of a second smaller uniform diameter. These brushes are stacked endwise and are attached to a vertically disposed rotatable shaft. The upper brush is comprised of a lightweight cloth-like material suitable for scrubbing the side windows of a car. Also, the upper brushes are of a larger diameter than the lower brush to facilitate more effective engagement with and cleaning of vehicle window surfaces. In addition, the lower brushes are comprised of a material which becomes heavy when laden with water so as to more effectively clean the generally dirtier portions of a car below the windows.

Frequently, as a vehicle is advanced through a vehicle wash, a front, a side and rear of the vehicle is first cleaned by wraparound brushes positioned along opposite sides of the path the vehicle travel. Subsequently, the vehicle encounters rocker panel brushes for additional cleaning of the dirtier lower side surfaces of the vehicle. An example of such a rocker panel brush mechanism is disclosed in U.S. Pat. No. 3,943,590 of Hanna. A car washing system showing the successive washing of a vehicle by wraparound brushes and rocker panel brushes is shown in U.S. Pat. No. 3,934,297 of Hanna. These rocker panel brushes frequently include a roller at their upper ends for engaging the side surfaces of a vehicle to prevent the rocker panel brush from traveling underneath the vehicle; for example, underneath the bed of a relatively high pickup truck. The use of separate wraparound and rocker panel brushes adds to the length of the vehicle wash when such brushes are presented in sequence.

Canadian Patent No. 497 422 of Rousseau discloses a series of rotary brushes for washing the side surfaces of a vehicle including, at each side of the vehicle, a wheel-cleaning brush, a lower side panel brush 21 and an upper window and body cleaning brush 20. The vehicle wash requires sufficient lineal space to accommodate both of the brushes 20 and 21. In addition, there is a possibility of the lower brush 21 travelling underneath and damaging a pickup truck or other high vehicle and the upper brush 20 travelling inwardly over cars, such as sports cars, with low hoods.

Still another vehicle side wash apparatus is disclosed in U.S. Pat. No. 3,593,357 of Oldham. This patent discloses separate driven window and side brushes on a common frame. The assembly includes a side brush rotatable by one hydraulic motor on a first vertical axis and a second window brush rotatable by second axis inclined from vertical toward a passing vehicle and controlled by a second motor. In this reference, the window and side brushes are understood to rotate about axes that are fixed relative to one another. Consequently, the engagement between the washer elements and severely curved surfaces of vehicles can be inhibited by this construction.

Still another side surface vehicle washing apparatus is disclosed in European Patent Application No. 0012683 of Schultz, published on Jun. 25, 1980. This publication appears to relate to a vehicle side washing apparatus having upper and lower rotary brush sections supported by a shaft formed of two articulated sections. Because these shaft sections are apparently joined together, less than optimum cleaning of severely curved vehicle surfaces can result. For example, the lower brush section can engage a portion of a vehicle and hold the lower end of the upper brush section away from the curved areas of the vehicle.

Therefore, a need exists for an improved vehicle washing apparatus particularly designed for washing the upright surfaces of a vehicle and directed toward overcoming these and other problems of prior art devices.

SUMMARY OF THE INVENTION

In accordance with the present invention an apparatus for washing upright surfaces of a vehicle includes an upper washer rotatable about a first upright axis, a lower washer rotatable about a second upright axis and means for coupling the upper washer to the lower washer so as to permit lateral shifting of the first and second axes relative to one another within limits.

This lateral shifting capability allows the upper washer to shift toward the vehicle and more effectively clean curved, indented and inwardly sloping portions of the vehicle while the lower washer is against and cleans lower side surfaces of the vehicle. Conversely, the lower washer may shift toward the vehicle relative to the upper washer for cleaning released areas of the lower vehicle surface.

Moreover, the limited relative motion of the upper and lower washers offers additional advantages. Specifically, the upper washer bearing against upper surfaces of a vehicle will prevent the lower washer from swinging partially underneath pickup truck beds or other relatively high portions of certain vehicles. In the same manner, the lower washer bearing against side surfaces of a vehicle will prevent the upper washer from swinging over the hood or other low profile areas of sports cars and other vehicles, such as Corvettes.

Also, this construction allows more uniform washer penetration and cleaning of a vehicle.

In accordance with another aspect of the present invention, independently controlled motors may be used for rotating the upper and lower washers. The lower washer may be rotated at a much faster rate than the upper washer for more effective cleaning of the dirtier lower side portions of a vehicle. In addition, the motors may be operated to select the direction of rotation of the washers independently of one another.

As still another more specific feature of the present invention, the washers may be comprised of washing material sections of different densities. More specifically, an intermediate section of the washer assembly, typically at a lower end of the upper washer, may be of the highest density. This provides the greatest cleaning power at chrome strip areas of a vehicle and also provides a cushion of sorts to control washer penetration at the side of a vehicle. The term "washer penetration" in this description means the extent to which the washer moves toward the vehicle during a cleaning opperation. In addition, washing material is typically of a lower density at upper portions of the upper washer as cleaning requirements are reduced at such locations. Also, the use of relatively low density washing material at these locations reduces the possibility of damage to antennas and mirrors mounted to these vehicle surface areas. Moreover, the lower washer is typically of a higher density washing material than the upper washer, with the exception of the most dense or cushioning area thereof, to provide more effective cleaning of these lower vehicle surfaces. These lower surfaces are frequently dirtier than the upper surfaces of a vehicle.

In accordance with a specific embodiment of the invention, the upper washer has a first core with a hollow lower end portion bounded by an interior wall surface. The lower washer has a second core and motion limiting means projecting upwardly from the second core and into the lower end portion of the first core. A motion limiting means, such as a shift or spindle to which a roller is mounted, is sized smaller in cross-section than the cross-sectional dimension of the interior of the first core. The motion limiting means extends into the first core and engages the interior wall surface of the first core to limit the relative shifting of the first and second cores and thereby the shifting of the upper and lower washers. Other suitable coupling mechanisms which permits this lateral shifting of the two washers within limits may also be used.

It is accordingly one object of the present invention to provide an improved vehicle washing apparatus and more particularly to provide such an apparatus for washing upright surfaces of a vehicle.

Still another object of the present invention is to provide vehicle washing apparatus which minimizes the possibility of washing elements passing underneath or over the top portions of a vehicle where they might damage the vehicle.

A further object of the present invention is to enhance the penetration and cleaning of curved and recessed upright surfaces of a vehicle.

Still another object of the present invention is to provide a washer for cleaning upper and lower side surfaces of a vehicle at one location in a vehicle wash to thereby permit a more linearly compact vehicle washing establishment.

These and other objects, features and advantages of the present invention will become more apparent with reference to the following description and drawings.

DETAILED DESCRIPTION OF A PREFERRED EMBODIMENT

Figure 1:
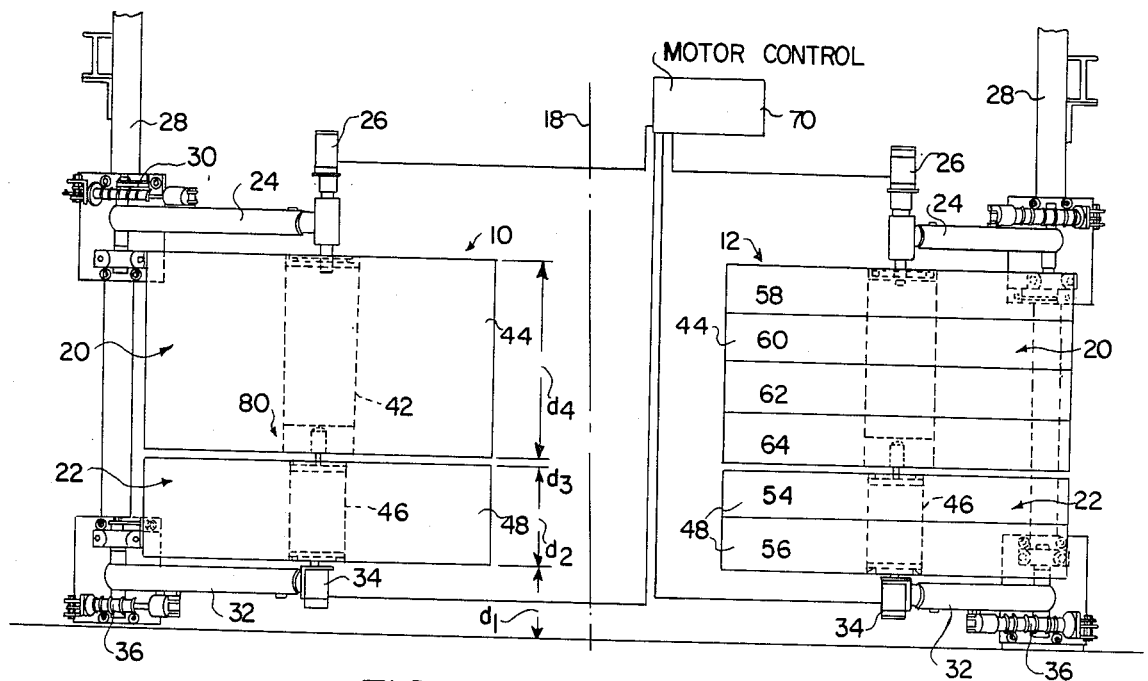
FIG. 1 is an end elevational view of two vehicle washing devices in accordance with the present invention.
Figure 2:
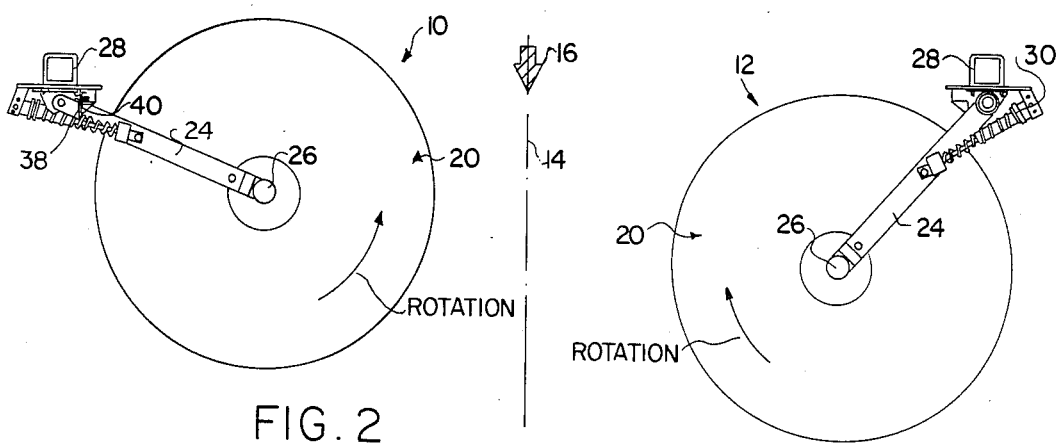
FIG. 2 is a top plan view of the vehicle washing devices of FIG. 1.

With reference to FIGS. 1 and 2, a pair of vehicle washing devices 10, 12 in accordance with the present invention are shown. These devices are positioned to wash the upright side surfaces of a vehicle traveling along a path 14 in the direction indicated by arrow 16. A line 18 in FIG. 1 illustrates the approximate center line of travel of a vehicle between the the washing devices 10, 12. Typically, the vehicle is transported by a conveyor (not shown) past the washing devices.

Each of the vehicle washing devices 10, 12 is substantially identical. Therefore, only washing device 10 is described in detail. Also, for convenience, corresponding numbers are used for identical components of the devices 10, 12.

The washing device 10 includes upper and lower washers 20, 22. The upper washer 20 is rotatably supported by a pivot arm 24 and is rotated by a motor 26. Arm 24 is pivoted to a post 28 which is connected to the framework of the vehicle wash. A biasing and shock assembly 30 holds the brush 20 against the sides of a vehicle and yet permits the brush to pivot away from the path of vehicle travel to accommodate wider vehicles. Biasing mechanism 30 is adjustable in a conventional manner to adjust the force of washer 20 against the vehicle. The lower washer is rotatably supported by a lower pivot arm 32 and is rotated by a motor 34. Pivot arm is also pivoted to post 28. The lower washer has a biasing and shock absorber mechanism 36 like mechanism 30.

A stop 38 (FIG. 2) is supported by post 28 in position to abut a stop engaging element 40 on arm 24. Stop 28 limits the pivoting of arm 24 and thereby washer 20 toward the entrance end of the vehicle wash. Similar stops are provided for each of the other pivot arms.

Upper washer 20 includes a central core 42 (shown in dashed lines in FIG. 1) to which washing material 44 is suitably attached. This washing material may comprise bristles or other material, but in the illustrated embodiment comprises panels of washing fabric such as disclosed in U.S. Pat. No. 4,670,929 of Hanna. In addition, the lower washer 22 has a core 46 to which washing material 48 is attached. The cores 42, 46 are mounted for rotation by the respective motors 26, 34 about upright axes and more specifically about vertical axes. Consequently, the washing material 44, 48 also rotates in the same manner and, when positioned against a vehicle passing through the vehicle wash, cleans the vehicle. As shown in FIG. 2, the washers 20 and also the washer 22, take on a generally circular shape when rotated. Although shown to be of uniform diameter, these washers may be of nonuniform diameter if desired. For example, the washing material 44 at the upper end of upper washer 20 may be of a greater diameter than the rest of the washing material 44 of washer 20, such as shown in the aforementioned U.S. Pat. No. 4,670,929.

By way of example, the distance $d_1$, from the floor of the vehicle wash to the lower edge of the lower washer 22 is approximately nine inches and the distance $d_2$, the height of the lower washer 22 is approximately fourteen inches. This places the lower washer at the elevation of the hard to clean lower side surfaces of typical vehicles. In addition, the spacing between the washers, $d_3$, is approximately one inch to allow the washers to shift laterally relative to one another as explained below. Also, the height $d_4$ of a typical upper washer is approximately twenty-eight inches. This positions the upper washer for cleaning the upper side surfaces and windows of vehicles. These distances should be viewed as exemplary as variations will be apparent to those of ordinary skill in the art.

Figure 4:
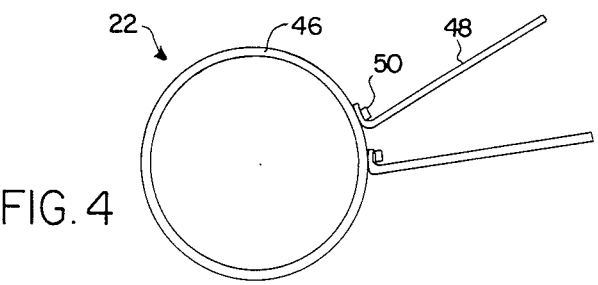
FIG. 4 is an illustration of a portion of a core for vehicle washer used in the washing devices of FIG. 1 and showing the attachment of washing material to the core.

As shown in FIG. 4, washing material 48 may comprise vertically oriented fabric panels held by vertical retaining strips 50 screwed or otherwise secured to core 46. These panels are typically positioned about the circumference of the core. Such panels are illustrated in greater detail U.S. Pat. No. 4,670,929 of Hanna. Again, other washing material is also suitable.

Referring to FIG. 1, the lower washer FIG. 22 is typically comprised of two washing element sections 54, 56. Sections 54, 56 are formed of washing material 48 of relatively heavy density. One way to increase the density of this washing material is to utilize fabric of heavier weight which absorbs more moisture from water sprayers positioned in a vehicle wash to spray these washers during use. In addition, the density of washing sections 54, 56 may be adjusted by adjusting the number of fabric panels attached to the core 46. For example, forty such panels may be positioned about the core at this location to provide a relatively dense brush for heavy cleaning of the lower portions of the vehicle.

In the same manner, washer 20 may be comprised of a plurality of sections, such as four such sections 58, 60, 62 and 64. Section 64, intermediate the ends of the stacked washer assembly comprised of washers 20, 22, is typically of the greatest density. For example, seventy-two attachments may be positioned about the core at this location. This washer section 64 is positioned at about the elevation of chrome strips typically found along the door regions of vehicles and functions to enhance the cleaning of such areas. In addition, the enhanced density of this section of the upper washer 20 helps cushion the washer and control the penetration of the washers 20, 22 toward the vehicle to some extent. That is, this washer section, due to its increased density, assists in controlling the extent to which washer 20 shifts towards the vehicle. Washer section 62 is typically of a density approximating that of the lower washer sections 54, 56, for example, thirty-six fabric panel attachments may be used for this section of the washer 20. The uppermost washer sections 58, 60 are typically of the lowest density, for example, eighteen fabric panel attachments may be used, so as to minimize the risk of entanglement with antennas and the like. Also, the upper portions of a vehicle tend to be less soiled so that a less dense brush is required for effective cleaning of those locations of a vehicle.

The motors 26, 34 are conventional and may comprise hydraulic motors which receive pressurized hydraulic fluid under the control of a motor control hydraulic circuit 70. To enhance the cleaning of lower sections of the vehicle, the lower washer 22 is typically rotated at a faster rate than the upper washer 20. For example, the lower washer may be operated at sixty-five revolutions per minute while the upper washer may be operated at forty to forty-five revolutions per minute. In addition, the direction of rotation of the washers 20 and 22 need not be the same. Moreover, if more than one set of washing devices 10, 12 are included in a vehicle wash, one set may be rotated in one direction while the following set may be rotated in the opposite direction. This enhances the pentration of the washing material into recesses and other hard to reach surfaces of a vehicle for enhanced cleaning.

In accordance with an important aspect of the present invention, a mechanism is provided for loosely coupling the upper washer 20 to the lower washer 22 so as to permit lateral shifting of these washers relative one another within limits. One mechanism for accomplishing this result is indicated generally at 80 and shown in greater detail in FIG. 3. As illustrated, the core 42 of upper washer 20 has a hollow interior 82 of generally circular cross-section. A cylindrical wall 84 is positioned within and mounted to the interior surface of core 42 at the lower end of this core. This wall 84 has a longitudinal axis which is aligned generally with the longitudinal axis of core 42. In addition, as explained below, the interior surface 86 of wall 84 comprises a wear surface against which a motion limiting mechanism moves to limit lateral shifting of the upper and lower washers.

The illustrated form of motion limiting mechanism comprises an upright shaft or spindle 88 carried by a plate 90 which is bolted or otherwise secured to an upper end piece 92 of core 46. When the apparatus is assembled, shaft 88 projects into the interior 82 of the lower end of the core 42. An elongated roller 94 of nylon, rubber or other suitable material is rotatably mounted to shaft 88 for rotation about the axis of the shaft, which is typically coincident with the axis of lower core 46. Roller 94 rests on a washer 96 supported by a stop 98 mounted to the shaft 88. The roller 94 is retained on the shaft 88 by a bolt and washer 99 threaded into the top of the shaft.

Figure 3:
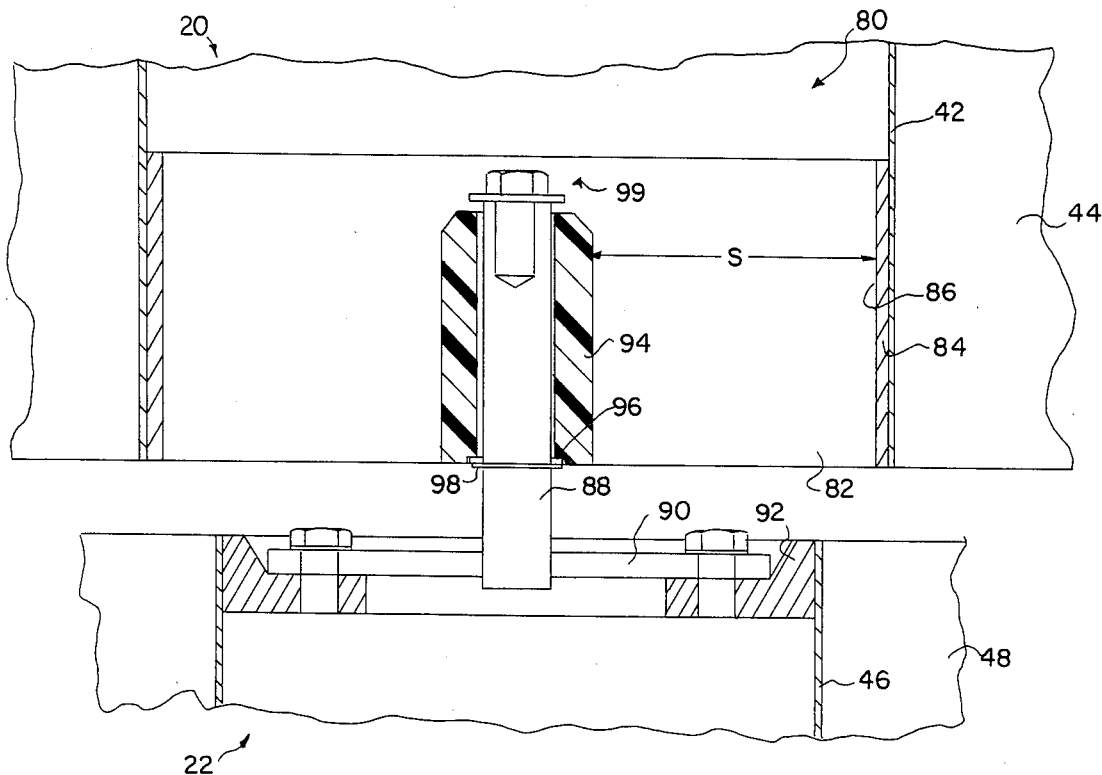
FIG. 3 is a partially broken away sectional view of a coupling mechanism for loosely interconnecting upper and lower washers of the devices of FIG. 1.

When in the position shown in FIG. 3, the axis of core 42, and thus of the upper washer 20, is aligned with the axis of core 46 and washer 22. A typical spacing S between the sides of roller 94 and wall surface 86 is approximately four inches, although this spacing may be varied. As a result, the washers 20, 22 may shift relative to each other laterally within the limits determined by rollers 94 and wall surface 86. That is, either of the washers may independently move toward or away from a vehicle until such time as the roller 94 engages the wall surface 86, at which point the washers shift together. This ability of the washers to move independently of one another within limits permits the washers to more closely follow the surfaces of a vehicle and clean these surfaces.

Other suitable motion limiting mechanisms which allow lateral shifting of the washers within limits will of course be apparent to those skilled in the art. In addition, the illustrated mechanism may be reversed with the roller assembly projecting from the lower end of the upper core into the upper end of the lower core.

Having illustrated and described the principles of my invention with reference to one preferred embodiment, it should be apparent to those persons skilled in the art that such invention may be modified in arrangement and detail without departing from such principles. I claim as my invention all such modifications as come within the true spirit and scope of the following claims:

1. An apparatus for washing upright surfaces of a vehicle comprising:

an upper washer means rotatable about a first upright axis;

a lower washer means rotatable about a second upright axis;

means mounted to one of the upper or lower washer means for engaging the other of the upper or lower washer for coupling the upper washer means to the lower washer means so as to permit lateral shifting of the first and second axes relative to one another within limits; and means for rotating the upper and lower washer means.

2. An apparatus according to claim 1 in which the means for coupling the washer means comprises means for loosely interconnecting the first and second washer means.

3. An apparatus according to claim 1 in which said means for rotating the upper and lower washer means comprises means for rotating the lower washer means at a faster rate than the upper washer means.

4. An apparatus according to claim 1 in which said means for rotating the upper and lower washer means comprises means for selecting the direction of rotation of the upper and lower washer means.

5. An apparatus according to claim 1 in which the upper washer means includes a first core and the lower washer means includes a second core, the apparatus including vehicle washing material means mounted to the first and second cores, the first core having a lower end portion, the washing material means mounted to the lower end portion of the first core being of a greater density than the density of washing material means mounted to the remainder of the first and second cores.

6. An apparatus according to claim 1 in which the upper and lower washer means include respective first and second cores and washing material means mounted to the cores, the washing material means comprising a first section of washing material of a first density mounted to the second core, the washing material means comprising a second section of washing material of a second density greater than the first density at a lower end of the first core, and the washing material means comprising at least one other section of a density lower than the first and second densities at the upper end of the first core.

7. An apparatus according to claim 1 in which the first and second axes are vertical, the upper washer means including a first elongated core rotatable about the first axis and the lower washer means including a second elongated core rotatable about the second axis, the upper and lower washer means including washing material means mounted to the first and second cores, the means for loosely interconnecting the upper and lower washer means comprising means interconnecting the lower end of the first core with the upper end of the second core so as to permit lateral shifting of the cores, and thereby the upper and lower washer means, relative to one another within limits.

8. An apparatus according to claim 7 in which the first core includes a hollow lower end portion with an interior wall surface and the second core includes motion limiting means projecting upwardly from the second core and into the lower end portion of the first core, the motion limiting means being sized smaller in cross section than the cross section of the interior of the lower end portion of the first core and comprising means for engaging the interior wall surface to limit the relative shifting of the first and second cores and thereby of the first and second washer means.

9. An apparatus according to claim 8 in which the motion limiting means comprises a shaft and roller pivoted to the shaft for engaging the interior wall surface to limit relative shifting of the first and second cores and thereby of the first and second washer means.

10. An apparatus for washing the upright surfaces of a vehicle comprising:

an upper washer rotatable about a first upright axis, the upper washer having a lower end portion;

a lower washer rotatable about a second upright axis, the lower washer having an upper end portion;

one of the lower and upper end portions having a hollow interior bounded by a motion limiting wall, the other of the lower and upper end portions including a wall engaging projection sized smaller in cross section than the cross sectional dimensions of the hollow interior and extending within the hollow interior, whereby the wall engaging projection engages the motion limiting wall as the upper and lower washer sections shift relative to one another to thereby limit the relative motion of the upper and lower washers;

means for rotating the upper and lower washers; and means for biasing the upper and lower washers toward the upright surfaces of the vehicle.

11. An apparatus according to claim 10 in which the means for rotating the upper and lower washer comprises means for rotating the upper washer at a slower speed than the lower washer.

12. An apparatus according to claim 10 in which the upper and lower washers include respective cores and washing material mounted to the cores, the washing material intermediate the lower end of the lower washer and the upper end of the upper washer being of a greater density than the washing material mounted to the remainder of the cores.

13. An apparatus for washing the side surfaces of a vehicle comprising:

an upper washer rotatable about a first upright axis, the upper washer having a lower end portion with a hollow interior and a cylindrical wall with an upright longitudinal axis bounding the interior of the lower end portion;

a lower washer rotatable about a second upright axis, the lower washer having an upper end portion;

a motion limiting shaft means projecting upwardly from the upper end portion and loosely into the hollow interior of the lower end portion;

a roller pivoted to the motion limiting shaft means for engaging the wall to limit the relative motion of the upper and lower washers, the roller being rotatable about an axis which is generally parallel to the longitudinal axis of the cylindrical wall;

means for independently rotating the upper and lower washers; and means for biasing the upper and lower washers toward the side surfaces of the vehicle.

* * * * *